UNITED STATES PATENT OFFICE.

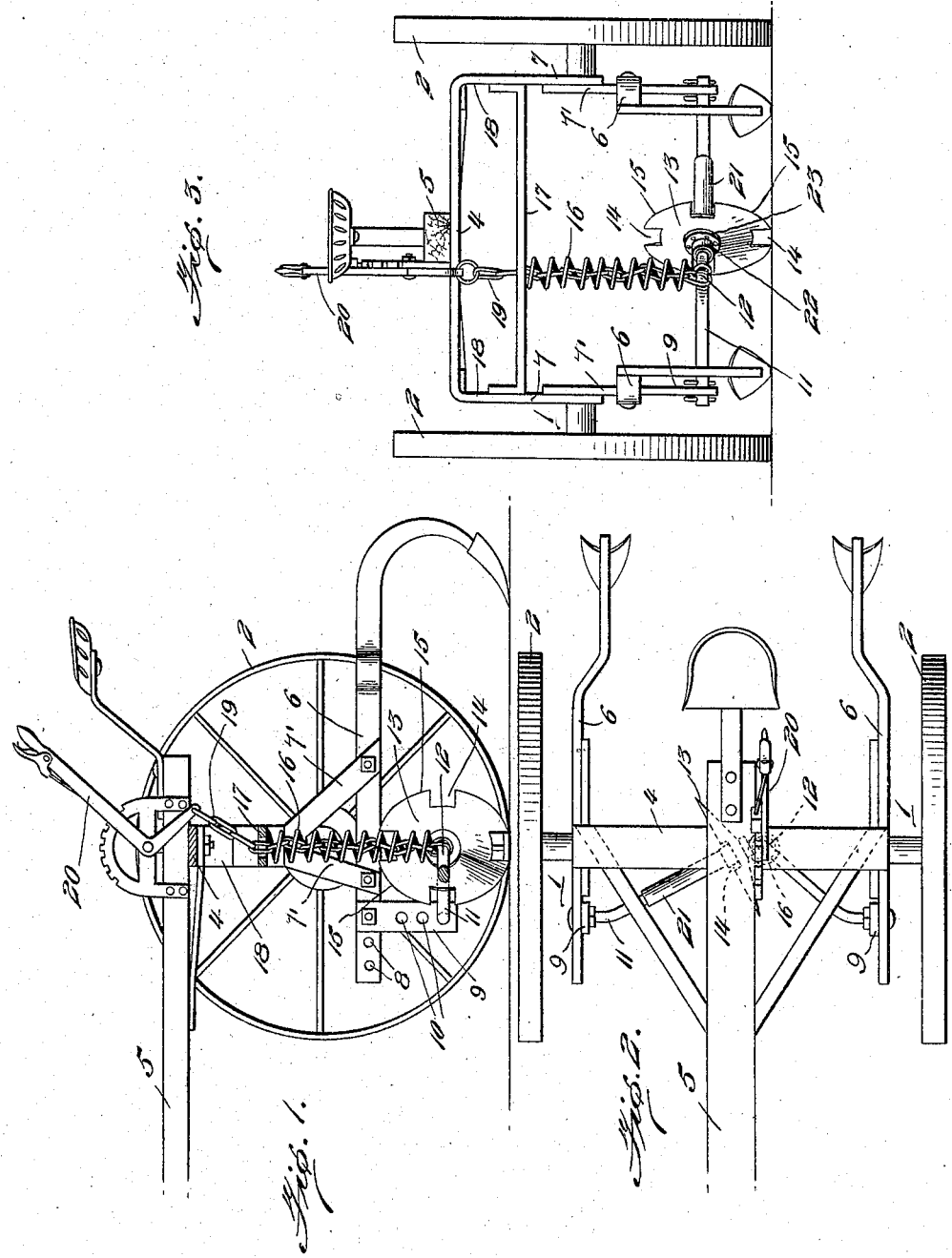

HENRY M. VINSON, OF CORNISH, OKLAHOMA.

COTTON-CHOPPER.

No. 918,800.     Specification of Letters Patent.     Patented April 20, 1909.

Application filed May 21, 1908. Serial No. 434,115.

*To all whom it may concern:*

Be it known that I, HENRY M. VINSON, a citizen of the United States, residing at Cornish, in the county of Jefferson and State of Oklahoma, have invented certain new and useful Improvements in Cotton-Choppers; and I do declare the following to be a full, clear, and exact description of the invention, such as will enable others skilled in the art to which it appertains to make and use the same.

This invention relates to new and useful improvements in cotton choppers and has for its object the production of a simple and effective device of this kind for chopping or thinning the growing cotton plants.

In the accompanying drawings; Figure 1 is a side elevation of a cotton chopper embodying my improvements, with parts broken away; Fig. 2 is a top plan view; and Fig. 3 is an end view.

In the embodiment illustrated, the axle 1 which is supported by the usual supporting wheels 2 is bent at its middle portion to form an arch 4 to which is connected the tongue 5.

The numeral 6 indicates the cultivator beams which are fastened to the end portions 7 of the arch by the fastening plates 7'. The front end of each of said beams is provided with a longitudinally spaced series of laterally extending apertures 8 to either of which is connected by bolts and nuts or other equivalent means the upper ends of hangers 9 provided each with a vertically spaced series of apertures 10. Either of the apertures of the respective hangers are adapted to receive one end of a transversely extending chopper disk supporting axle 11, the central portion 12 of which extends rearwardly and is of approximately V-shaped form.

The numeral 13 indicates the chopper disk which is revolubly mounted at one side of the apex of the central portion of the axle and by reason of this fact extends across the rows of cotton plants at an angle, said disk being provided with a peripheral series of spaced notches or recesses 14 designed to leave standing certain of the growing plants, while the portions of the disk which are not notched or recessed, as at 15, are intended to crush down the plants intervening between those left standing by the notches. This disk is of convex concavo form in order to dispose its periphery at an angle so that it will cut into the ground at an angle and thereby cut the weeds, cotton plants, and other debris therefrom with greater facility. When more than the usual amount of grass and weeds are present, the right hand end of the axle is inserted in the upper aperture of the adjacent hanger 9, in order to dispose the chopping disk in a leaning or angular position which materially increases the effect of its cutting action and enables the weeds, grass or the like to be removed with greater facility. By employing an axle of the construction shown, it is evident that the disk will be allowed to ride or pass over any stumps, obstructions or the like without raising the ends of the axle. It is also evident that by employing the construction of hangers shown, the axle may be adjusted at different heights and in this way the cotton chopper disk may accommodate itself to the ground, whether the cotton is planted in a furrow or on a ridge. It is equally evident that by providing series of apertures in the front ends of the cultivator beams that the chopper disk supporting axle is susceptible of various longitudinal adjustments with respect to the cultivator.

In carrying out the invention, a vertically disposed pressure spring 16 is arranged between the apex of the cotton chopper supporting axle and a cross piece 17 which extends between the side pieces 18 of the arch 4, said spring serving to resist elevation of said axle. An operating chain 19 is also connected with the apex of said axle and extends longitudinally through the pressure spring 16 and cross piece 17 and is connected at its upper end with one arm of a bell crank lever 20 mounted upon the tongue 5. The lower end of said pressure chain is connected with the axle in order to allow the spring to expand to only a predetermined extent and the chopper disk to cut into the ground to the desired depth.

In practice, a sleeve 21 is fitted upon the chopper disk supporting axle 1 on one side of the apex thereof and constitutes a bearing for the hub of the chopper disk, said hub being preferably formed by hub sections 22 provided with flanges 23 which are bolted to opposite faces of the disk.

From the foregoing description, taken in connection with the accompanying drawings, the construction and operation of the invention will be readily understood without requiring a more extended explanation.

Various changes in the form proportion and the minor details of construction may be resorted to without departing from the principle or sacrificing any of the advantages of the invention, as defined in the appended claim.

Having thus described my invention, what I claim as new is:—

In a device of the class described, the combination with a supporting frame of cultivator beams fastened thereto, a one-piece supporting axle mounted beneath the front ends of the beams, said axle having a rearwardly extending V-shaped central portion, a spring to resist elevation of the central portion of said axle, and manually operated means for raising the central portion of the axle against said spring, said means comprising a flexible element extending through the coils of said spring and attached to said axle, and an operating lever pivotally mounted upon the supporting frame and attached to the upper end of said flexible element.

In testimony whereof I have hereunto set my hand in presence of two subscribing witnesses.

HENRY M. VINSON.

Witnesses:
 W. C. HOGAN,
 D. F. SPRADLING.